United States Patent

[11] 3,589,747

| [72] | Inventor | Sture Lennart Asberg<br>Savedalen, Sweden |
|---|---|---|
| [21] | Appl. No. | 814,285 |
| [22] | Filed | Apr. 9, 1969 |
| [45] | Patented | June 29, 1971 |
| [73] | Assignee | SKF Industries, Inc.<br>King of Prussia, Pa. |
| [32] | Priority | Apr. 10, 1968 |
| [33] | | Netherlands |
| [31] | | 6,805,108 |

[54] ROLLING BEARING
14 Claims, 8 Drawing Figs.

| [52] | U.S. Cl. | 280/96.1 |
|---|---|---|
| [51] | Int. Cl. | B62d 1/00 |
| [50] | Field of Search | 180/43;<br>280/96.1; 308/191 |

[56] References Cited
UNITED STATES PATENTS

| 982,117 | 1/1911 | Borger | 280/96.1 |
|---|---|---|---|
| 1,091,419 | 3/1914 | Yandell | 180/43 |
| 2,212,193 | 8/1940 | Reese | 180/43 |
| 3,253,670 | 5/1966 | Thomas et al. | 180/43 |
| 3,446,537 | 5/1969 | Sutowski | 301/1 |

*Primary Examiner*—Fred C. Mattern, Jr.
*Assistant Examiner*—Frank Susko
*Attorney*—Howson and Howson

ABSTRACT: A bearing assembly for a wheel-mounting arrangement for a vehicle consisting of a stub axle member adapted to be mounted on a support member of the vehicle comprising at least one pair of axially spaced circumferentially extending inner raceways integral with the stub axle member, a common outer ring overlying said raceways and spaced therefrom to define an annular space for at least two rows of rolling elements, the wheel of the vehicle adapted to be mounted on said outer ring.

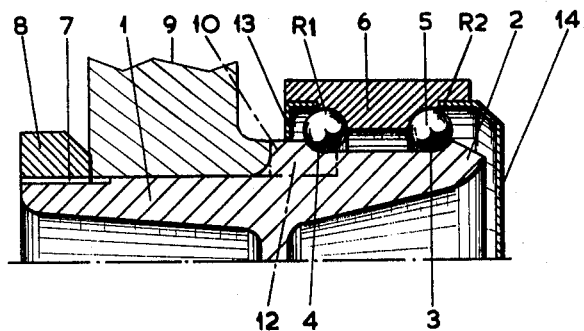
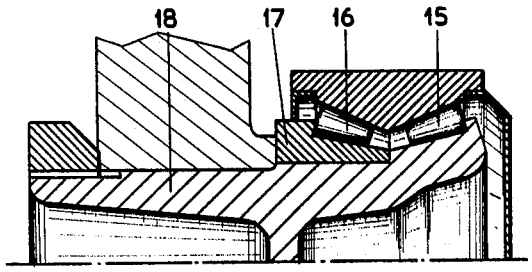

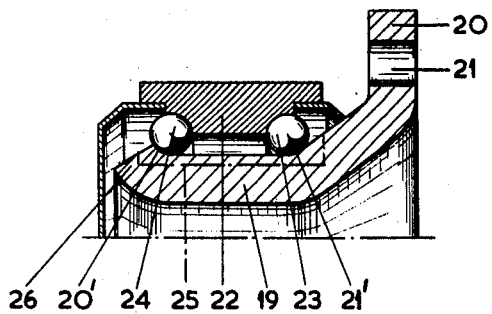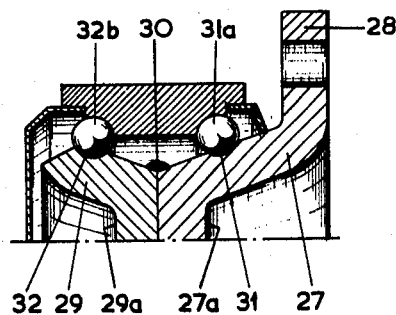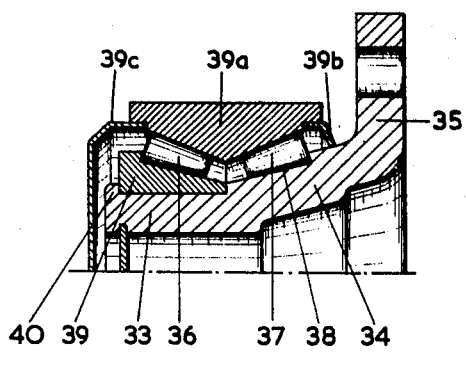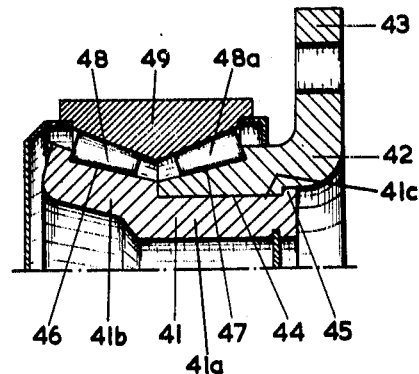

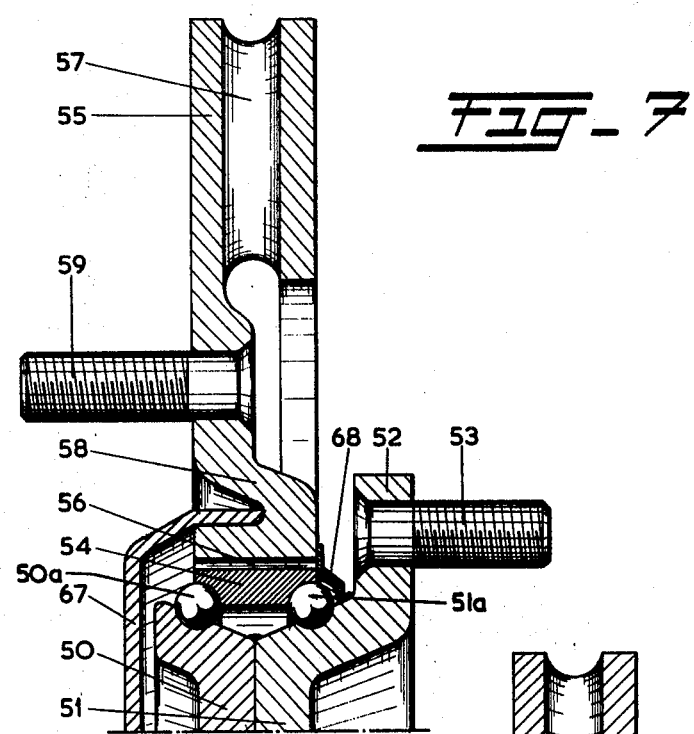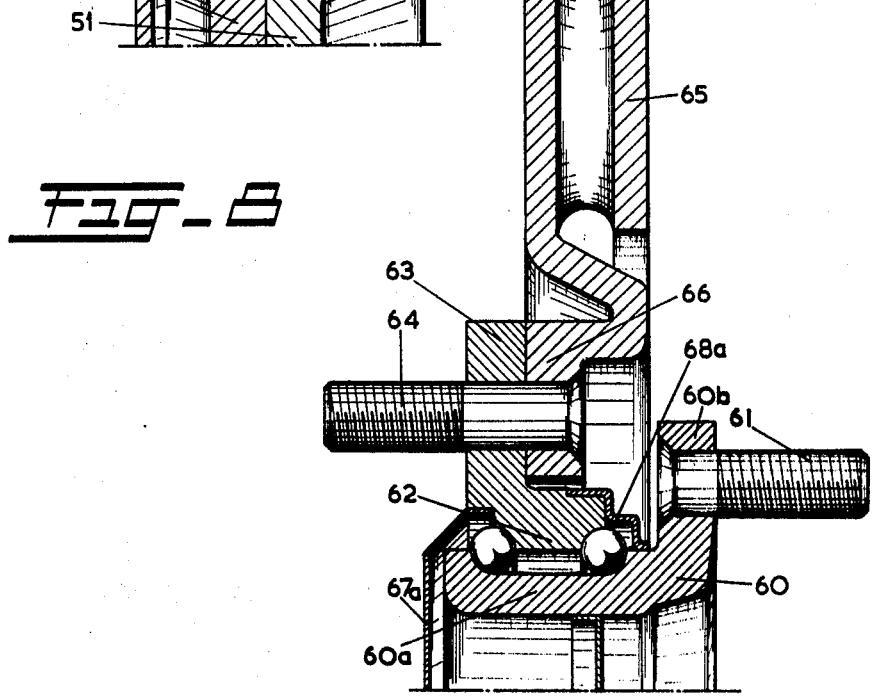

ROLLING BEARING

The present invention relates to improvements in rolling bearings and more particularly to a bearing assembly for a nondriven wheel of a vehicle such as a motor vehicle.

In some prior wheel assemblies of the above type, the stub axle is connected to the steerable wheel by means of a swivel pin with which the stub axle is integrally formed. This, of course, is a precisely worked forging. In this arrangement, the wheel bearings are secured by a nut placed at one end of the stub axle and locked by suitable means. It is noted that in these assemblies, two separate ball or roller bearings are employed which are usually of different diameters and which are detachably mounted on the stub axle. Of course, this requires machining of the stub axle to provide seats for the bearing assemblies.

An object of the present invention is to provide a simplification of the bearing design for a wheel assembly whereby a unit assembly is provided which is inexpensive to manufacture, easy to replace, and provide an interval unit which can be replaced in its entirety.

This object is achieved according to the present invention by providing a stub axle which is detachable from the bearing element such as the yoke of the front-end suspension system and forming at least one of the inner bearing surfaces of the roller or ball bearings mounted on the stub axle as a nondetachable part of the stub axle. In this manner, the stub axle may be manufactured less expensively and less expensive bearings may be employed. Preferably, both inner raceways or bearing surfaces are formed in the stub axle whereby the entire stub axle and bearing assembly are replaced when the bearings fail.

In accordance with the present invention, the inner bearings surface or surfaces may be ground into the stub axle member. In this manner the stub axle can be manufactured, for instance as a press forging, casting or forging, since it is not necessary to manufacture therein precise seats for the rings of the bearings formerly used, which had to be done by turning and grinding. In other words, the stub axle is simply ground to form the inner bearing surfaces in the desired locations.

An integral unit of a bearing and stub axle may be provided where the inner rings are mounted in such a manner that they are nondetachable. This can be done in various ways. For example, the inner rings may be positioned on the stub axle, which is molded out of sheet metal, and by cold-forming it in such a manner to form a locking flange retaining the inner ring in place. This manner of assembly and processing is greatly simplified and very inexpensive.

The stub axle and bearing assembly may be assembled to the bearing element, for example the yoke member of a front-end suspension system, by passing it through an opening therein and locking it inside the element on one side by a shoulder formed on the stub axle and on the other side by a locking nut placed on the external screw thread of the stub axle. By this arrangement, the tightening and slackening of the nut respectively, the entire unit can be easily assembled and disassembled when desired or necessary.

The stub axle member may also be provided with a flange at one end so that it may be connected to the bearing element.

In accordance with another form of the invention, the brake drum or disc may be formed integrally with the outer ring of the bearing assembly. According to the invention, the brake disc or drum can now be connected with the outer ring in a nondetachable way. In this way it forms a part of the unit. This implies that the disc or drum can be constructed in a more simple way. For instance, the disc may be connected with the outer ring with the possible insertion of a heat isolation (ceramic material) in such a way that it forms a compound unity with said ring. It is also possible to connect the disc or drum with the flange of the outer ring, but this time, according to the invention, on the inside so that the construction gets more compact. Even when bolts have been used for the construction, the disc or drum is not detachable any more as soon as the whole unit will have been assembled.

According to the invention, the outer ring may finally be provided with a cover completely covering the bearings and the stub axle member from the outside. There will be only a packing needed now on the inside.

These and other objects of the present invention and the various features and details of the operation and construction thereof are hereinafter more fully set forth with reference to the accompanying drawings, wherein;

FIG. 1 is a fragmentary sectional view of an integral stub axle-bearing assembly in accordance with the present invention:

FIG. 2 is a view similar to FIG. 1 except that tapered roller elements are employed;

FIG. 3 is a fragmentary sectional view of a second embodiment of stub axle-bearing assembly in accordance with the present invention;

FIG. 4 is a modified form of the assembly shown in FIG. 3 wherein the stub axle member is two piece;

FIG. 5 is a fragmentary sectional view of a third embodiment of stub axle-bearing assembly in accordance with the present invention;

FIG. 6 is an assembly similar to FIG. 5 except that the flange member is formed separately;

FIGS. 7 and 8 are fragmentary sectional views of fourth and fifth embodiments of stub axle-bearing assemblies in accordance with the present invention.

Referring now to the drawings and particularly to FIG. 1 thereof, the stub axle-bearing assembly of the present invention comprises a generally cylindrical body portion 1 having an out-turned flange portion at one axial end as indicated at 2 and having formed in its exterior surface inner bearing surfaces or raceways 3 and 4. In the present instance, the bearing surfaces are formed by grinding the exterior surface of the forward end of the stub axle body portion 1. The bearing includes a one-piece common outer race ring 6 and in the present instance two rows R1 and R2 of rolling elements such as balls 5. The outer ring 6 supports the rotating parts such as the wheel and/or the wheel and brake disc. In the present instance, the inner terminal end of the body portion 1 is provided with screw threads 7 to which a nut may be secured to permit assembly of the stub axle body and bearing assembly to a bearing element 9 such as the yoke member of a front-end suspension system or the like. As illustrated, the stub axle passes through an opening in the bearing element 9 or support member such as the yoke of the front-end suspension system of a motor-propelled vehicle which seats between a shoulder and the nut 8. The shoulder 10 may be formed by a separate ring 12 which may also form the inner ring of the innermost row R1 of balls. An annular seal 13 of inverted L-shaped cross section may be provided to protect the bearing at one end and a cup 14 of the screwcap type may close the outer forward end of the stub axle member body.

The assembly shown in FIG. 2 is generally similar in overall arrangement to that shown in FIG. 1 with the exception that in lieu of balls, two rows of tapered rolling bearings 15 and 16 are provided. In this instance the assembly further includes an annular ring member 17 which has a tapered frustoconical face defining the bearing surface or raceway for the innermost row of rollers that may be press-fitted onto the exterior of the body 18 of the stub axle member.

FIG. 3 shows another embodiment of a bearing-stub axle assembly in accordance with the present invention. The assembly includes a generally cylindrical, hollow body portion 19 having a radial flange at one axial end with a plurality of circumferentially spaced openings 21 to permit assembly to a bearing element, for example the yoke member of a front-end suspension system. The stub axle body 19 in the present instance may be formed by being pressed out of sheet metal wherein the outer surface is ground to define inner bearing surfaces or raceways 20' and 21' for two rows of balls 23 to 24. In lieu of forming the raceways 20' to 21' by grinding the outer surface of the stub axle body portion 19, an insert in the form of one or two rings shown by the broken lines 25 may be provided, which rings may be locked in place after assembly by peening or cold-forming the terminal axial edge as at 26.

There is shown in FIG. 4 still another embodiment of stub axle-bearing assembly in accordance with the present invention. In the present instance, the stub axle body comprises a pair of shells, an inner half shell 27 having a radial flange 28 provided with a plurality of circumferentially spaced openings for attachment to a bearing element as in the previously described embodiment and an outer half shell 29 secured to the shell 27 by suitable means, for example resistance welding. A circumferentially extending rubber bead 30 is provided during the welding operation to prevent sparks from flying outside during the welding operation. In the present instance, the bearing surfaces or raceways 31 and 32 for the two rows of balls 31a and 32a are ground into the outer peripheral surface of the shells 27 and 29 respectively. It is noted the grinding operation is done before the shells are secured together. In lieu of welding the shells together, they may be secured, for example by rivets extending through the radially inwardly depending flange portions 27a and 29a of the shells.

In the embodiment of the invention illustrated in FIG. 5, the stub axle body comprises a generally cylindrical portion 33, a frustoconical section 34 and a radially outwardly directed flange 35 having a plurality of circumferentially spaced opening for securing the assembly to a bearing element, for example the yoke of a suspension system for a front-wheel assembly. As illustrated, the rolling elements are two axially spaced rows of tapered roller bearings 36 and 37. The inner bearing surface or raceway for the rollers 37 is provided by grinding the exterior surface of the frustoconical section 34, and the inner bearing surface for the row of rollers 36 is provided by a ring 39 nondetachably secured to the cylindrical section 33 by cold-forming the inner terminal edge of the cylindrical section to form a circumferentially extending locking bead 40 which holds the ring in place. An outer ring 39a of generally triangular cross section is provided together with the inner and outer seals 39b and 39c.

The embodiment of the invention illustrated in FIG. 6 is generally similar to the arrangement shown in FIG. 5. However, in this instance the stub axle body consists of two separate parts 41 and 42 which are integrally secured together by cold-forming the outer terminal edge portion of the part 41 to define circumferentially extending flange engaging a shoulder on the part 42. As illustrated, the part 41 has a generally cylindrical section 41a and a frustoconical outer section 41b, the cylindrical section defining a shelf 41c within which the inverted L-shaped part 42 nests. The outer surface of the frustoconical section 41b defines the bearing surface for the outer row of rollers 48 and the leg of the part 42 is ground to provide a frustoconical bearing surface for the row of rollers 48a. An outer ring 49 to which the wheel and brake disc or drum assembly is mounted completes the assembly.

It will be apparent that in the preferred embodiments according to the invention a bearing design has been obtained that lacks a great many operations to it, when one compares this design with the designs already known, it becomes apparent that it is simpler and less expensive, while the design according to the invention is such that a unit has been obtained when the design has been assembled, a unit that can only be assembled and disassembled in its entirety, so that when any part of it gets damaged or worn out and has to be replaced, the replacement of the entire unit is the only solution. However, this simplifies the repairs considerably. Then again, one is no longer dependent on the lesser or greater professional skill of the one who has to carry out the repairs otherwise.

It may be observed that in the various designs the roller guides are placed in position through an opening, not shown in the drawing, between the bearing rings, an opening in the unballasted part which is a way of filling a ball or roller bearing known per se.

There is illustrated in FIG. 7 another embodiment of stub axle bearing assembly in accordance with the present invention. The stub axle body consists of two half shelves 50 and 51 that may be nondetachably secured together, for example by means of welding. The shell 51 is provided with an outwardly directed radial flange 52 having a plurality of openings to receive fasteners in the form of bolts 53 to secure the assembly to a bearing element, for example the yoke of the front end of a wheel suspension system. The outer surface of the shells 50 and 51 are ground to define raceways for two rows of balls 50a and 51a respectively. The outer ring 54 of the assembly in the present instance mounts a brake disc 55 which has openings therein to accommodate bolts for securing the brake disc to the wheel. A layer of heat-isolating ceramic material 56 may be provided between the outer ring and the brake disc 55. The brake disc as illustrated is provided with a plurality of radial cooling channels as well as a fillet 58. The assembly further includes a cap member 67 which closes the entire bearing at one end to obviate the need for a packing on this side of the bearing. The other side of the bearing is provided with the dimensional packing 68. Of course, in lieu of the brake disc, a brake drum may be mounted on the outer ring 54.

There is illustrated in FIG. 8, another embodiment of the assembly in accordance with the present invention. In this instance, the stub axle 60 has a generally cylindrical body portion 60a and a radial flange 60b with openings to accommodate bolts 61 for securing the assembly to a bearing element or the like. The outer surface of the cylindrical body portion 60a is formed with a cavity to accommodate two rows of balls. In the present instance, the outer ring 62 is provided with a radially extending flange portion 63 to which the brake disc or drum 65 may be secured by means of the bolt 64. This assembly also includes the usual outer cap member 67a and stepped packing 68a.

It is noted that in all of the wheel-mounting assemblies described above, there is a one-piece common outer race ring.

I claim:

1. A nondriven wheel-mounting assembly of a motor-propelled vehicle such as an automobile having a support member, a stub axle member, means for detachably mounting said stub axle member to the support member of the vehicle, at least one pair of axially spaced circumferentially extending inner raceways integral with the stub axle member, a one-piece common outer race ring overlying said raceways and spaced therefrom to define an annular space for at least two rows of rolling elements, said outer ring having means integral with it to which the wheel of the vehicle can be secured, said stub axle member, inner raceway means and ring forming an integral easily replaceably unit.

2. An assembly as claimed in claim 1, characterized in that the inner bearing raceway surfaces have been ground into the material of the stub axle member.

3. An assembly as claimed in claim 1, characterized in that at least one inner bearing raceway surface is on a ring that has been nondetachably fixed to the stub axle member.

4. An assembly as claimed in claim 3, characterized in that the nondetachable ring for the inner bearing raceway surface has been attached to the stub axle member by cold-forming of the material.

5. An assembly as claimed in claim 1, characterized in that the stub axle member has been passed through an opening in the support member and has been locked in on the one side by a shoulder formed on the outside of said stub axle member and on the other side by a nut placed on an external screw thread of said stub axle member.

6. An assembly as claimed in claim 1 characterized in that the stub axle member consists of a body having a flange on the inside provided with means for the attachment to the support member.

7. An assembly as claimed in claim 6, characterized in that the body provided with a flange is a pressed sheet metal body.

8. An assembly as claimed in claim 6 characterized in that the body consists of two shallow, conically shaped half shells attached to each other with their bottom parts, the innermost one containing the flange on its edge.

9. An assembly as claimed in claim 6 characterized in that the body consists of a hollow, truncated, conically shaped part with a flange on the part with the greatest diameter, while an inner ring has been attached to the end by deforming this end in an outward direction.

10. An assembly as claimed in claim 6 characterized in that the body consists of two parts that fit onto each other via a cylindrical plane and are nondetachably linked to each other forming each a bearing surface or carrying one at the outside.

11. An assembly as claimed in claim 1 characterized in that the brake disc or brake drum has been nondetachably linked with the outer ring of the bearing.

12. An assembly as claimed in claim 11, characterized in that the disc with the insertion of an isolation has been directly, securely attached to the outer ring in such a way that it is forming a unit with the ring.

13. An assembly as claimed in claim 11, in which the outer ring has a flange for the attachment to the disc, characterized in that the disc has been placed on the inside of the flange.

14. An assembly as claimed in claim 1 characterized in that the outer ring has a closed cap that closes off the bearings and the stub axle member completely.